United States Patent [19]

Leger et al.

[11] Patent Number: 5,124,843
[45] Date of Patent: Jun. 23, 1992

[54] ARRAY ILLUMINATOR USING A BINARY OPTICS PHASE PLATE

[75] Inventors: James R. Leger, Groton; Gary J. Swanson, Lexington, both of Mass.

[73] Assignee: Massachusetts Institute of Technology, Cambridge, Mass.

[21] Appl. No.: 457,492

[22] Filed: Dec. 27, 1989

[51] Int. Cl.⁵ ............................................. G02B 27/44
[52] U.S. Cl. .................................. 359/565; 359/569; 359/619
[58] Field of Search .................. 350/162.2, 167, 403, 350/405; 359/565

[56] References Cited

U.S. PATENT DOCUMENTS

| | | | |
|---|---|---|---|
| 4,575,849 | 3/1986 | Chun | 350/403 |
| 4,598,977 | 7/1986 | Kobayashi | 350/162.2 |
| 4,697,878 | 10/1987 | Kimura et al. | 350/162.2 |
| 4,708,436 | 11/1987 | Kleinknecht | 350/162.2 |
| 4,800,547 | 1/1989 | Kessels et al. | 350/162.17 |
| 4,813,762 | 3/1989 | Leger et al. | 350/162.16 |
| 4,850,673 | 7/1989 | Velzel et al. | 350/201.5 |
| 4,933,649 | 6/1990 | Swanson et al. | 350/162.2 |
| 4,935,939 | 6/1991 | Liau et al. | 350/96.15 |
| 5,027,359 | 6/1991 | Leger et al. | 372/19 |
| 5,033,060 | 6/1991 | Leger et al. | 372/18 |

OTHER PUBLICATIONS

Packross, Bernd et al., "Image Synthesis Using Self Imaging", OPTICS COMMUNICATIONS, vol. 56, No. 6, Jan. 15, 1986, pp. 394–398.
A. W. Lohmann, "An Array Illuminator Based on the Talbot-effect", Optik, vol. 79, No. 1, 1988, pp. 41–45.
A. W. Lohmann et al., "Realization of an Array Illuminator based on the Talbot Effect", 1988 Annual Report, p. 29, printed after Jan. 1, 1989.
J. A. Thomas, Diplom Thesis, "Binary-Phase Elements In Photoresist", Mar. 1989, Chapters 5 and 6.

*Primary Examiner*—Bruce Y. Arnold
*Assistant Examiner*—J. P. Ryan
*Attorney, Agent, or Firm*—Fish & Richardson

[57] ABSTRACT

An optical element for converting a uniform beam of light of wavelength λ into an array of illuminated spots, the optical element including a phase plate made of an array of constant phase zones; and an image plane disposed parallel to and at a preselected distance from the phase plate, the preselected distance being selected so that illuminating the phase plate with uniform coherent illumination of wavelength λ produces the array of illuminated spots on the image plane, the spot array having a fill factor in at least one dimension that is less than ½.

39 Claims, 6 Drawing Sheets

$z_t/4$ $z_t/6$ $z_t/8$

ARRAY ILLUMINATOR USING A BINARY OPTICS PHASE PLATE

The Government has rights in this invention pursuant to Contract Number F19628-85-C-0002 awarded by the Department of the Air Force.

BACKGROUND OF THE INVENTION

The invention relates to an optical device for converting a uniform light beam into an array of light spots for illuminating a periodic array.

A periodic array of illumination spots is required by several electrooptic devices. For example, two-dimensional optical logic arrays require uniform illumination of each optical gate in the array to provide power to the array. Some vertical cavity surface-emitting laser diode arrays are optically pumped, thus requiring a regular array of pump sources. In addition, in certain processors where clock skew currently limits the cycle time of the processor, a synchronous distribution of clock signals to electronic or optical logic elements would overcome that limitation.

There are currently several techniques for illuminating periodic arrays. One common method uses a diffraction grating to split a single beam into many diffraction orders. Since simple diffraction gratings do not produce a uniform set of illumination spots, specially designed gratings have been fabricated to produce a uniform spot array with high efficiency. However, there is a practical limit on the number of illumination spots obtainable by this method.

Arrays of microlenses have also been used to convert uniform illumination into a set of focussed spots. However, the light from a single microlens array is not uniform in amplitude or phase across each spot. Uniform illumination can be produced by using two planes of microlenses in a Galilean or Newtonian telescope configuration, but this is done at the expense of added complexity and additional alignment problems. Finally, phase contrast methods have also been used to convert phase masks into amplitude distributions. This system requires several additional optical elements as compared to the other described approaches and it places constraints on the fill factor achievable for the resultant image.

SUMMARY OF THE INVENTION

In general, in one aspect, the invention is an optical element for converting a uniform beam of light of wavelength $\lambda$ into an array of illuminated spots. The optical element includes a phase plate which is an array of constant phase zones; and an image plane disposed parallel to and at a preselected distance from the phase plate, the preselected distance being selected so that illuminating the phase plate with uniform coherent illumination of wavelength $\lambda$ produces the array of illuminated spots on the image plane, the spot array having a fill factor in at least one dimension that is less than $\frac{1}{2}$.

Preferred embodiments include the following features. The phase plate is a two-dimensional array of constant phase zones and the spot array has a fill factor of less than $\frac{1}{4}$. The preselected distance is $mZ_t + Z_t/2N$ where $Z_t$ is the Talbot distance for the phase plate, m is an integer or half integer and N is an integer greater than 2. The phase plate is constructed from an $N \times N$ unit cell including $N^2$ constant phase zones, the phase $\phi_{I,J}$ associated with each constant phase zone in the unit cell being given by $$\phi_{I,J} = \pm \pi \frac{(I^2 + J^2)}{N}$$

where N is an integer that is greater than 2 and where I and J are indexes identifying the particular constant phase zone in the unit cell, when N is even, I and J are integers ranging from $-N/2$ to $(N/2-1)$ and when N is odd I and J are half integers ranging from $-N/2$ to $(N/2-1)$.

Also in preferred embodiments, the preselected distance may be specified by $mZ_t - Z_t/2N$, or $mZ_t + Z_t/(2N-1)$, or $mZ_t - Z_t/(2N-1)$, where $Z_t$ is the Talbot distance for the phase plate, m is an integer or half integer and N is an integer greater than 2.

In general, in another aspect, the invention is an optical element for converting a uniform beam of light of wavelength $\lambda$ into an array of illuminated spots. The optical element includes a substrate having a to surface and a bottom surface parallel to and separated from the top surface by a preselected distance; and a phase plate formed on the top surface, the phase plate comprising an array of constant phase zones; the preselected distance being selected so that illuminating the phase plate with uniform coherent illumination of wavelength $\lambda$ produces the array of illuminated spots on the bottom surface, the spot array having a fill factor in at least one dimension that is less than $\frac{1}{2}$.

The invention has the following advantages. Its light efficiency is close to 100%. Furthermore, there is no upper limit on the number of illumination apertures that can be produced and the smallness of the fill factor that is obtainable is limited only by the fabrication technology that is used. The illumination apertures are uniform in amplitude and phase and the phase levels of the illumination apertures occur at specific quantized values. Thus, the illumination apertures can be fabricated with no approximations by multilevel etching techniques. In addition, the entire optical element may be contained on a single surface of a thin substrate and is amenable to mass fabrication by replication in plastic. Also, the optical element's sensitivity to dust and scratches can be reduced by using fractional Talbot planes at $mZ_t + Z_t/2N$ where m is an integer greater than zero, and N = 1/(Fill Factor in one dimension).

Other advantages and features will become apparent from the following description of the preferred embodiment and from the claims.

BRIEF DESCRIPTION OF THE DRAWINGS

FIG. 2b is an exploded cross-sectional view of a portion of the array illuminator shown in FIG. 2a;

DESCRIPTION OF THE PREFERRED EMBODIMENT

Structure and Operation

Figure 1:
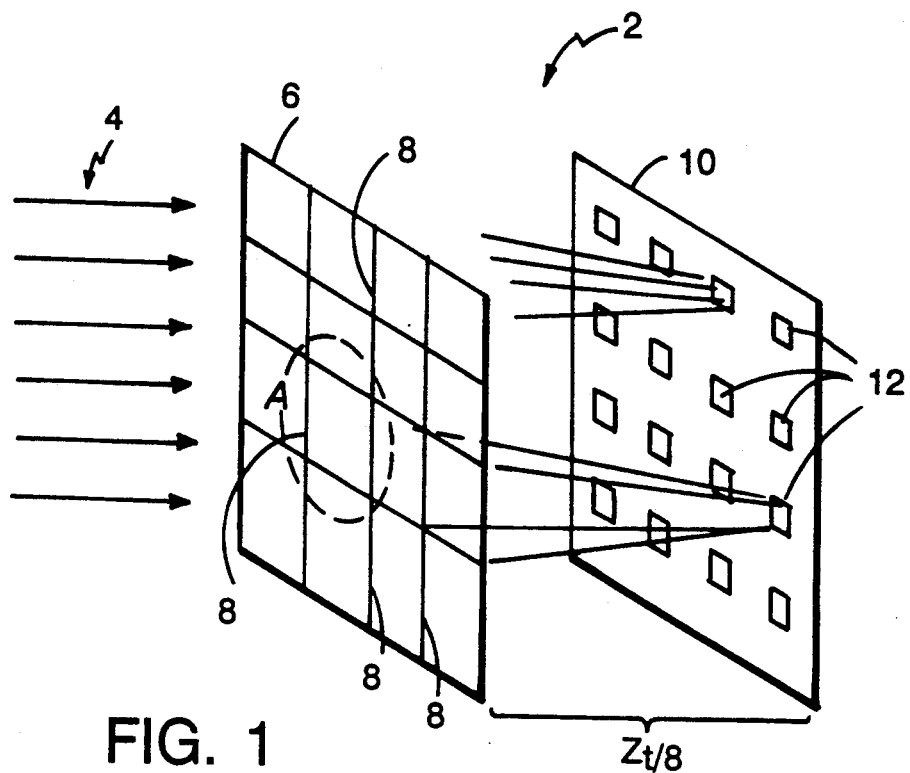
FIG. 1 depicts an array illuminator.
Figure 1A:
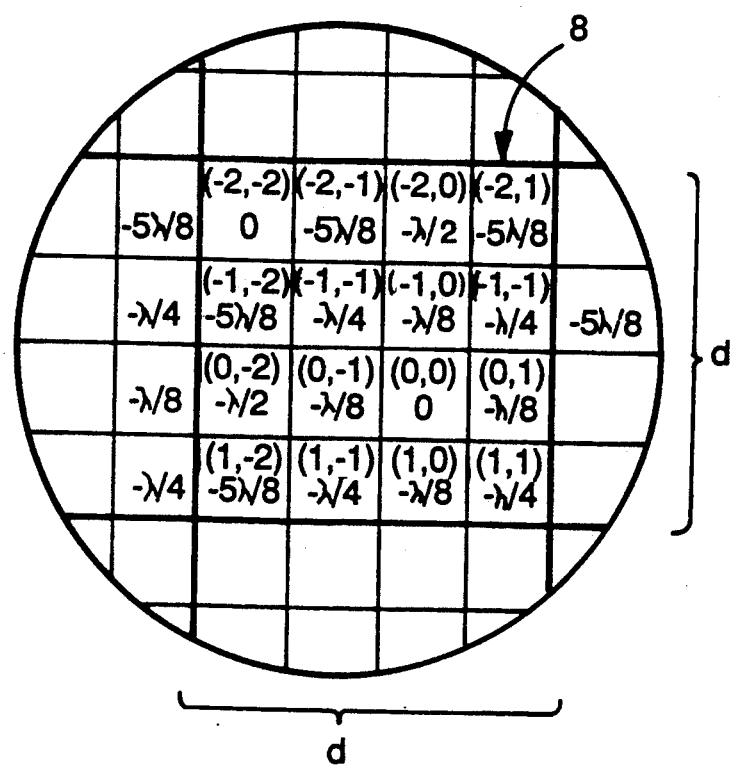

Referring to FIG. 1, an array illuminator 2 which is uniformly illuminated by a plane wave of coherent light 4 of wavelength $\lambda$ includes a phase plate 6 made up of an array of cells 8, each of which is an $N \times N$ (where $N=4$) array of identically shaped constant phase zones $8(i,j)$, where i and j are integer indexes ranging from 0 to 3. The size of each cell 8 is d by d, and the size of each constant phase zone is d/N by d/N. Each constant phase zone $8(i,j)$ of cell 8 is designed so as to cause coherent light beam 4 traveling through that zone to be delayed in phase by a corresponding amount relative to the other zones. The specified amount of relative phase delay for each zone $8(i,j)$ is indicated in the inset of FIG. 1. Thus, for the case of $N=4$, zone $8(0,1)$ causes a phase delay of the transmitted light beam 4 relative to zone $8(0,0)$ of $\lambda/8$; zone $8(1,2)$ causes a phase delay of the transmitted light beam 4 relative to zone $8(0,0)$ of $5\lambda/8$; etc.

Parallel to and spaced at a fraction of Talbot distance $Z_t$ from phase plate 6 is an image plane 10 which contains an array of light receivers 12. In the context of this description, light receivers 12 include detectors, optical resonators or any optical device which requires illumination by a periodic array of light. In this embodiment, the fractional Talbot distance separating phase plate 6 from image plane 10 is $Z_t/2N$ (i e., $Z_t/8$), where $Z_t$ equals $2d^2/\lambda$. When phase plate 6 is uniformly illuminated by light beam 4, it produces an array of uniform)y illuminated squares at image plane 10 that are d by d in size and are spaced Nd apart. Light receivers 12 on image plane 10 are aligned with the uniformly illuminated squares so as to receive energy from light beam 4. Thus, phase plate 6 converts uniformly distributed light beam 4 into an image array having a fill factor of $(1/N)^2$ (i.e., 1/16 for $N=4$).

Figure 2A:
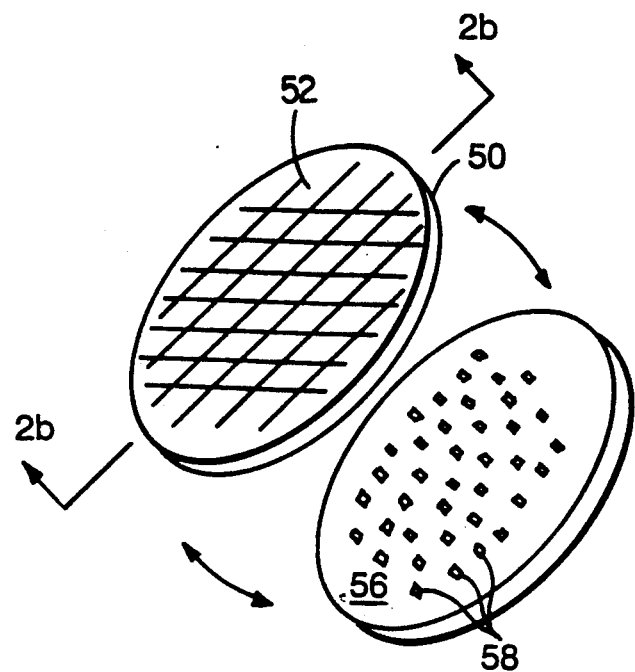
FIG. 2a depicts an array illuminator that is fabricated on a single substrate.
Figure 2B:
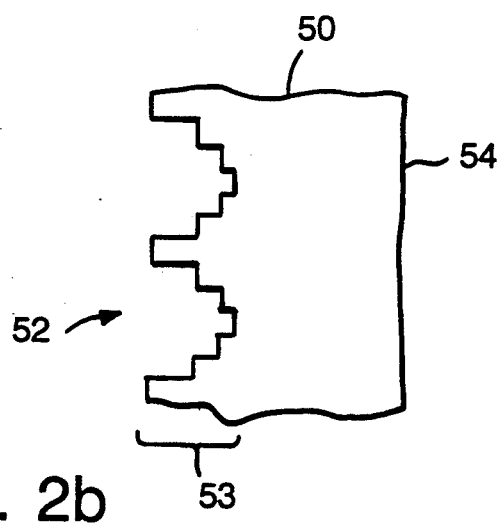

As shown in FIGS. 2a–b, an array illuminator such as the one just described may be fabricated on a single wafer of quartz 50 having a top surface 52 and a bottom surface 54. Standard binary-optics fabrication techniques may be employed to etch multilevel zones into top surface 52 to form a phase plate 53. And the thickness of wafer 50 may be chosen so that bottom surface 54 is located at the desired fractional Talbot distance from phase plate 53. Such a structure may be used as a stand-alone array illuminator that can be physically butted up against a device 56 that contains an array of light-receiving elements 58. Of course, the structure must be properly aligned with circuit 56 so that the illuminated spots coincide with light-receiving elements 58. A fluid, such as oil, may be used to improve the coupling between the structure and circuit 56 and to eliminate air pockets that might interfere with light transmission between the structure and circuit 56.

As another alternative, top surface 52 of wafer 50 may be anti-reflection coated and bottom surface 54 may have the binary-optics pattern placed on it. In that case, wafer 50 would not contact the light-receiving array, but would be held at the required distance $Z_T/2N$ by spacers.

Figure 3A:
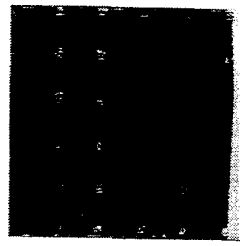
FIGS. 3a–d depict an aperture array and images produced at different fractional Talbot distances from the aperture array.

The principle underlying the array illuminator can be extended to construct an array illuminator that produces a fill factor which may have any one of a wide range of values. The underlying principle relates to a phenomenon known as Talbot self imaging. Talbot self-imaging occurs when a periodic array of apertures is illuminated with coherent light. If the array of apertures, such as is illustrated in FIG. 3a is infinite in extent, an image of the array (correct in both amplitude and phase) is formed by free-space diffraction at integer multiples of the Talbot distance $Z_t = 2d^2/\lambda$, where d is the period of the array and $\lambda$ is the wavelength of the light. The integer multiples of the Talbot distance define what may be referred to as Talbot planes.

Figure 3B:
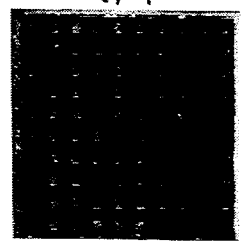

At particular fractional Talbot distances, that is, at particular planes located between the Talbot planes (which may be referred to as fractional Talbot planes), the light distribution produces other images of the array. For example, at half a Talbot distance, i.e. $Z_t/2$, an image of the array shifted by one half period is produced. And, as shown in FIG. 3b, at the fractional Talbot plane located at $Z_t/4$, a double image consisting of one image which is in registration with original array and a second image is shifted by one half period is produced.

Figure 3C:
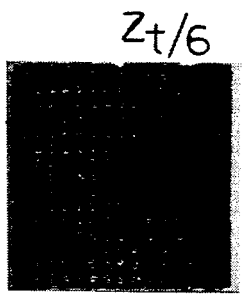
Figure 3D:
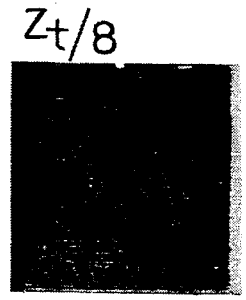

At even higher order fractional Talbot planes, more than two multiple copies of shifted images are produced. For example, at $Z_t/6$, a triple image of the original array exists, as shown in FIG. 3c. Indeed, the number of copies which are produced is related to the order of the fractional Talbot plane. That is, the planes at $Z_t/2N$, where $N \geq 1$, contain N equally spaced copies of the original aperture. In this case, the copies are registered with the original aperture for even N and are shifted by $\frac{1}{2}N$ for odd N. In addition, the planes at $Z_t/(2N-1)$, where $N \geq 1$, contain a second set of multiple images. In this latter case, $2N-1$ equally spaced copies of properly registered images result. In each case, the phase of the light is constant across a single copy of the aperture, but changes from copy to copy within one period.

By properly selecting the fill factor for the aperture array, a uniform light intensity can be achieved over certain fractional Talbot planes. That this is true is demonstrated by a specific example illustrated through FIGS. 4a–d, which show a computer simulation of Fresnel diffraction from a one-dimensional periodic array of square apertures with a fill factor of $\frac{1}{8}$.

Figure 4A:
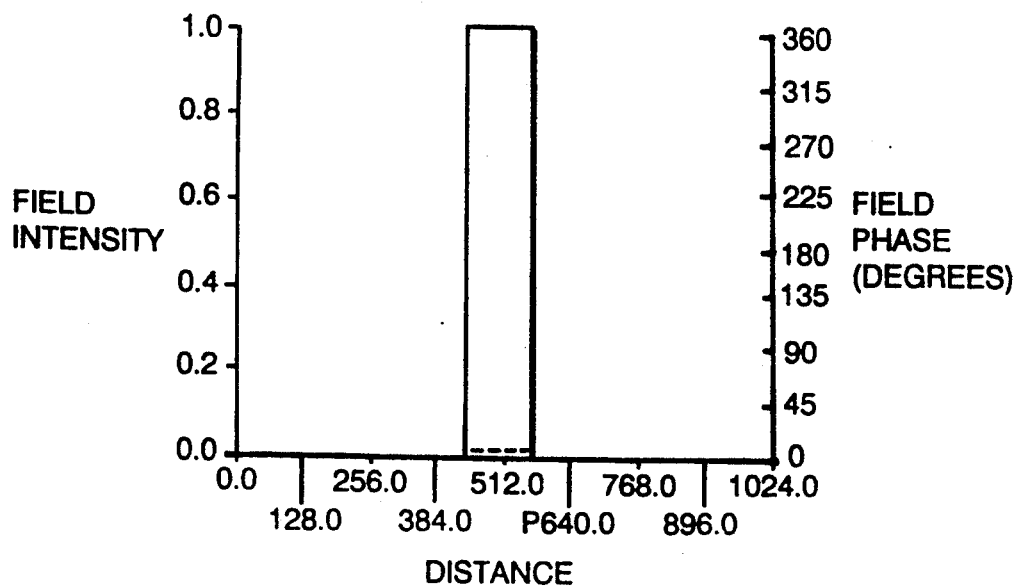
FIGS. 4a–d depict a computer simulation of the phase and intensity of illumination generated by a uniformly illuminated one-dimensional aperture array at the $Z_t/4$, the $Z_t/8$ and the $Z_t/16$ fractional Talbot planes.
Figure 4B:
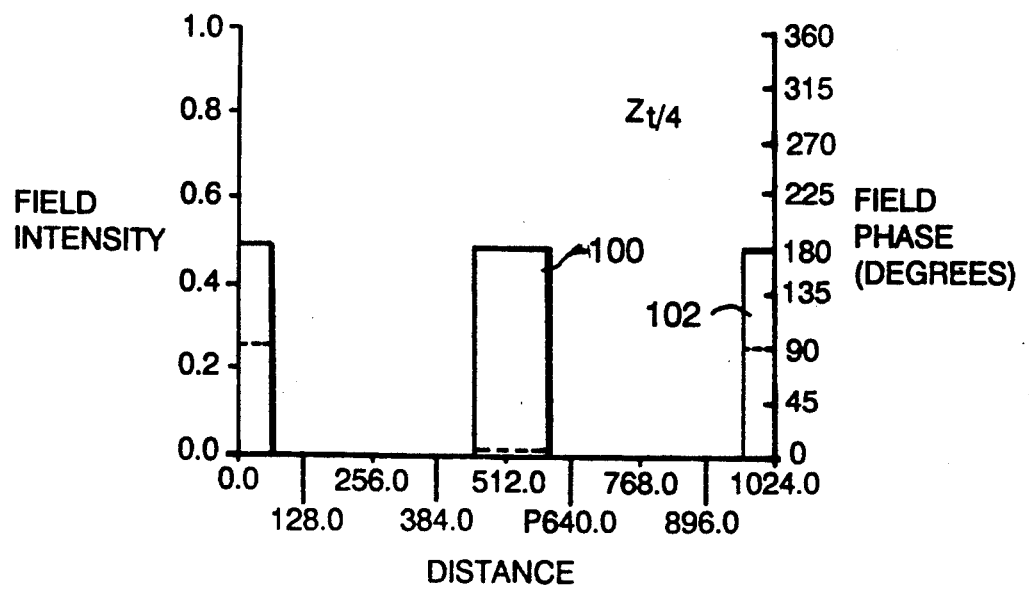
Figure 4C:
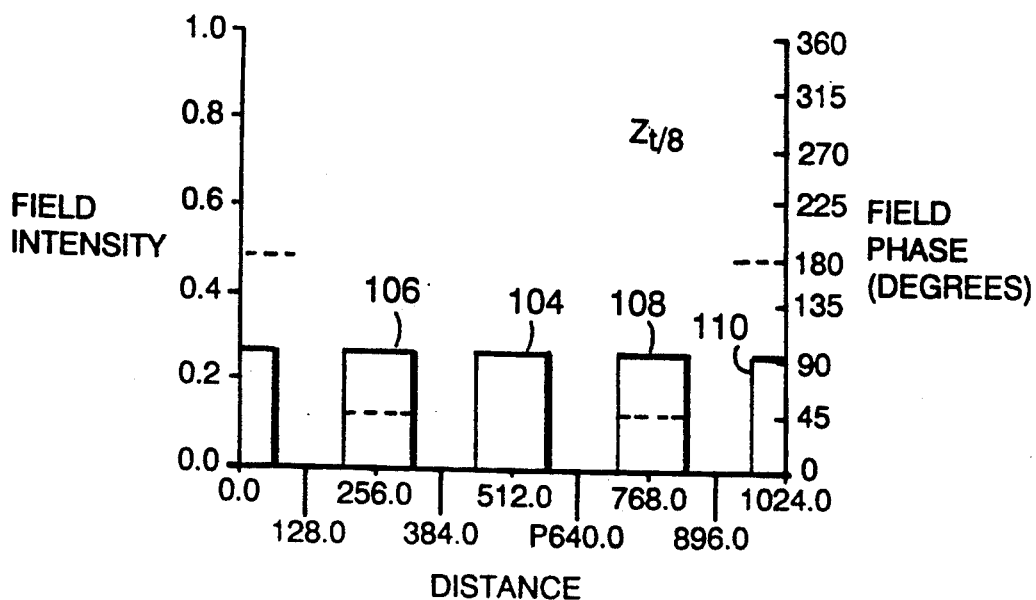
Figure 4D:
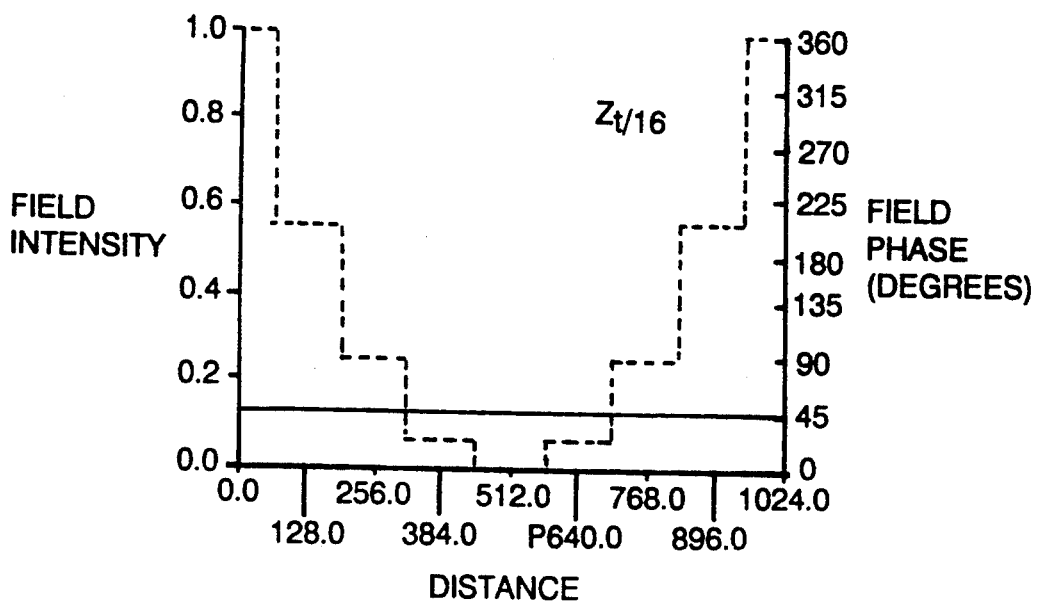

FIGS. 4a–d show only one period of an infinite array. The figures represent the illumination of the original aperture array and the illumination appearing at the $Z_t/4$, the $Z_t/8$ and the $Z_t/16$ fractional Talbot planes, respectively. As shown in FIG. 4a, the original array has apertures that are $\frac{1}{8}$ of a period wide (i.e., $N=8$). As shown in FIG. 4b, the $Z_t/4$ fractional Talbot plate for that array contains two images of the original aperture, namely, one image 100 that is in register with the original aperture and a second image 102 shifted one half period. The light at the shifted image 102 is 90° out of phase with the light at image 100. As shown in FIG. 4c, the $Z_t/8$ fractional Talbot plane contains 4 images, namely, one image 104 that is in register with the original aperture, two images 106 and 108 that are shifted to either side of the original image by one quarter period, and a fourth image 110 that is shifted one half period. The phases of images 106, 108 and 110 relative to image 104 are 45°, 45°, and 180°. Finally, as shown in FIG. 4d, the $Z_t/16$ fractional Talbot plane contains eight replications of the original aperture, each shifted with respect to the other so that they completely fill one period of the original array. That is, the $Z_t/16$ fractional Talbot plane appears to be uniformly illuminated. The phase corresponding to each replication of the original aperture is constant but the phase across one period of image array varies in a quantized quadratic manner.

The following generalization of the above example can be stated. A uniformly illuminated array of square apertures with a fill factor of 1/N (in one dimension) is converted into a uniform amplitude distribution at the fractional Talbot plane specified by $Z_t/2N$. The phase across a single period of the image in that fractional Talbot plane consists of N equally spaced constant phase sections in which the phases relative to the phase of the section that is in register with the original aperture are given by:

$$\phi = -\pi \frac{I^2}{N}$$

where I is an integer for even N and a half integer for odd N ranging from $-N/2$ to $(N/2)-1$.

An optical element for array illumination can be realized by performing the above described procedure in reverse. That is, a two-dimensional phase plate that converts a uniform beam into an array of uniformly illuminated squares with a two-dimensional fill factor of $(1/N)^2$ at the $Z_t/2N$ fractional Talbot plane is formed by replicating a unit cell of $N \times N$ constant phase zones. The phase of each zone in the unit cell is given by:

$$\phi(I,J) = \frac{-\pi(I^2 + J^2)}{N}$$

where I and J are integers for even N and half integers for odd N ranging from $-N/2$ to $(N/2)-1$.

Figure 5A:
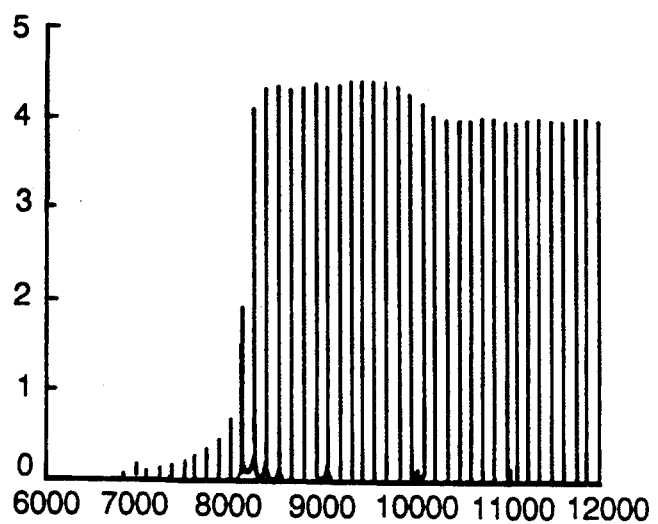
FIGS. 5a–b depict edge effects associated with a finite array.
Figure 5B:
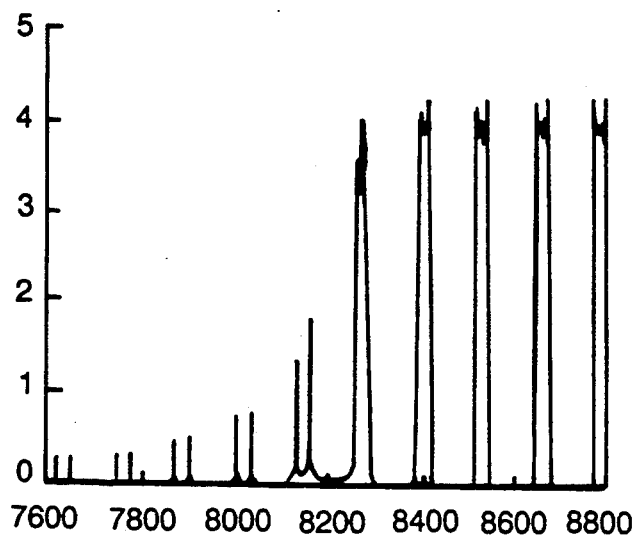

For an infinite array in the paraxial approximation, the technique is 100% efficient. For a finite array, however, edge effects may reduce the overall efficiency slightly. For example, the impact of edge effects can be estimated by calculating the Fresnel diffraction pattern from a finite array. FIG. 5a shows the edge effects for a phase plate designed to produce 128 uniformly illuminated apertures with a duty cycle of 25%. The apertures near the edge are slightly distorted (shown in the enlargement in FIG. 5b), with a small amount of power falling outside the array area. The fraction of power in the 128 desired apertures (in one dimension) is 99.4% for this case, leading a two-dimensional efficiency of 98.8%. Since the number of reduced intensity apertures is independent of array size and approximately independent of fill factor, the average efficiency is virtually 100% for all large arrays independent of duty cycle.

Finally, fractional Talbot images also occur at higher order Talbot planes. For example, the fractional Talbot image which occurs at $Z_t/2N$ also occurs at $mZ_t+Z_t/2N$ and shifted images occur at $(m+\frac{1}{2})Z_t+Z_t/2N$, where m is any integer. Conjugate phase images occur at $mZ_t-Z_t/2N$. and shifted conjugate phase images at $(m+\frac{1}{2})Z_t-Z_t/2N$. Operation of the element in higher order planes may be useful to reduce the sensitivity to dust and scratches on the optical element (at a slight reduction in efficiency).

Other embodiments are within the following claims.

What is claimed is:

1. An optical element for converting a uniform beam of light of wavelength λ into an array of illuminated spots, the optical element comprising:
   a phase plate for receiving said uniform beam of light of wavelength λ and generating an output beam of light therefrom, said output beam of light producing, through a reverse operation of the Talbot self-imaging phenomenon, an array of illuminated spots at a preselected distance from said phase plate, said array of illuminated spots having a fill factor in at least one dimension that is less than $\frac{1}{3}$; and
   a spacer assembly installed on the phase plate, said spacer assembly defining an image plane disposed parallel to and at the preselected distance from the phase plate.

2. The optical element of claim 1 wherein the preselected distance is $mZ_t+Z_t/2N$ where $Z_t$ is the Talbot distance for the phase plate, m is an integer or half integer and N is an integer greater than 3.

3. The optical element of claim 2 wherein m equals 0.

4. The optical element of claim 2 wherein the phase plate is constructed from an $N \times N$ unit cell comprising $N^2$ constant phase zones, the phase $\phi_{I,J}$ associated with each constant phase zone in the unit cell being given by $$\phi_{I,J} = -\pi \frac{(I^2 + J^2)}{N}$$

where I and J are indexes identifying the particular constant phase zone in the unit cell, when N is even, I and J are integers ranging from $-N/2$ to $(N/2-1)$ and when N is odd, I and J are half integers ranging from $-N/2$ to $(N/2-1)$.

5. The optical element of claim 1 wherein the preselected distance is $mZ_t-Z_t/2N$ where $Z_t$ is the Talbot distance for the phase plate, m is an integer or half integer and N is an integer greater than 3.

6. The optical element of claim 5 wherein m equals 0.

7. The optical element of claim 5 wherein the phase plate is constructed from an $N \times N$ unit cell comprising $N^2$ constant phase zones, the phase $\phi_{I,J}$ associated with each constant phase zone in the unit cell being given by $$\phi_{I,J} = \pi \frac{(I^2 + J^2)}{N}$$

where I and J are indexes identifying the particular constant phase zone in the unit cell, when N is even, I and J are integers ranging from $-N/2$ to $(N/2-1)$ and when N is odd, I and J are half integers ranging from $-N/2$ to $(N/2-1)$.

8. The optical element of claim 1 wherein the preselected distance is $mZ_t+Z_t/(2N-1)$, where $Z_t$ is the Talbot distance for the phase plate, m is an integer or half integer and N is an integer greater than 3.

9. The optical element of claim 1 wherein the preselected distance is $mZ_t-Z_t/(2N-1)$, where $Z_t$ is the Talbot distance for the phase plate, m is an integer or half integer and N is an integer greater than 3.

10. The optical element of claim 1 wherein the phase plate is a one-dimensional array of constant phase zones.

11. The optical element of claim 1 wherein the phase plate is constructed from an $N \times 1$ unit cell comprising N constant phase zones, the phase $\phi_I$ associated with each constant phase zone in the unit cell being given by $$\phi_I = -\pi \frac{I^2}{N}$$

where N is an integer that is greater than 3 and where I is an index identifying the particular constant phase zone in the unit cell, when N is even, I is an integer ranging from −N/2 to (N/2−1) and when N is odd, I is a half integer ranging from −N/2 to (N/2−1).

12. The optical element of claim 1 wherein said phase plate comprises an array of constant phase zones.

13. The optical element of claim 1 further comprising an array of light receivers located in said image plane, each light receiver of said array of light receivers being aligned to be illuminated by a different one of the illuminated spots of said array of illuminated spots.

14. The optical element of claim 1 further comprising a light source for generating said uniform beam of light.

15. An optical element for converting a uniform beam of light of wavelength λ into an array of illuminated spots, the optical element comprising:
a substrate having a top surface and a bottom surface parallel to and separated from the top surface by a preselected distance; and
a phase plate formed on the top surface, the phase plate for receiving said uniform beam of light of wavelength λ and generating an output beam of light therefrom, said output beam of light producing, through a reverse operation of the Talbot self-imaging phenomenon, an array of illuminated spots at the preselected distance from said phase plate;
the preselected distance being selected so that illuminating the phase plate with uniform coherent illumination of wavelength λ produces the array of illuminated spots on the bottom surface, the spot array having a fill factor in at least one dimension that is less than $\frac{1}{3}$.

16. The optical element of claim 15 wherein said phase plate comprises an array of constant phase zones.

17. The optical element of claim 16 wherein the phase plate is a two-dimensional array of constant phase zones and the spot array has a fill factor of less than 1/9.

18. The optical element of claim 16 wherein the phase plate is a two-dimensional array of constant phase zones and the spot array has a fill factor of less than 1/9.

19. The optical element of claim 16 wherein the preselected distance is $mZ_t + Z_t/2N$ where $Z_t$ is the Talbot distance for the phase plate, m is an integer or half integer and N is an integer greater than 3.

20. The optical element of claim 19 wherein m equals 0.

21. The optical element of claim 19 wherein the phase plate is constructed from an N×N unit cell comprising $N^2$ constant phase zones, the phase $\phi_{I,J}$ associated with each constant phase zones in the unit cell being given by $$\phi_{I,J} = -\pi \frac{(I^2 + J^2)}{N}$$

where I and J are indexes identifying the particular constant phase zone in the unit cell, when N is even, I and J are integers ranging from −N/2 to (N/2−1) and when N is odd, I and J are half integers ranging from −N/2 to (N/2−1).

22. The optical element of claim 16 wherein the preselected distance is $mZ_t − Z_t/2N$ where $Z_t$ is the Talbot distance for the phase plate, m is an integer or half integer and N is an integer greater than 3.

23. The optical element of claim 22 wherein m equals 0.

24. The optical element of claim 22 wherein the phase plate is constructed from an N×N unit cell comprising $N^2$ constant phase zones, the phase $\phi_{I,J}$ associated with each constant phase zone in the unit cell being given by $$\phi_{I,J} = \pi \frac{(I^2 + J^2)}{N}$$

where I and J are indexes identifying the particular constant phase zone in the unit cell, when N is even, I and J are integers ranging from −N/2 to (N/2−1) and when N is odd, I and J are half integers ranging from −N/2 to (N/2−1).

25. The optical element of claim 16 wherein the preselected distance is $mZ_t + Z_t/(2N−1)$, where $Z_t$ is the Talbot distance for the phase plate, m is an integer or half integer and N is an integer greater than 3.

26. The optical element of claim 16 wherein the preselected distance is $mZ_t − Z_t/(2N−1)$, where $Z_t$ is the Talbot distance for the phase plate, m is an integer or half integer and N is an integer greater than 3.

27. The optical element of claim 16 wherein the phase plate is a one-dimensional array of constant phase zones.

28. The optical element of claim 16 wherein the phase plate is constructed from an N×1 unit cell comprising N constant phase zones, the phase $\phi_I$ associated with each constant phase zone in the unit cell being given by $$\phi_I = -\pi \frac{I^2}{N}$$

where N is an integer that is greater than 3 and where I is an index identifying the particular constant phase zone in the unit cell, when N is even, I is an integer ranging from −N/2 to (N/2−1) and when N is odd, I is a half integer ranging from −N/2 to (N/2−1).

29. The optical element of claim 15 further comprising an array of light receivers located in said image plane, each light receiver of said array of light receivers being aligned to be illuminated by a different one of the illuminated spots of said array of illuminated spots.

30. The optical element of claim 15 further comprising a light source for generating said uniform beam of light.

31. A method of making an optical element for converting a uniform beam of light of wavelength λ into an array of illuminated spots, the method comprising:
providing a substrate having a top surface and a bottom surface parallel to and separated from the top surface by a preselected distance;
forming a phase plate on the top surface, the phase plate comprising an array of constant phase zones;
the preselected distance being selected so that illuminating the phase plate with uniform coherent illumination of wavelength λ produces, through a reverse operation of the Talbot self-imaging phenomenon, the array of illuminated spots on the bottom surface, the spot array having a fill factor in at least one dimension that is less than $\frac{1}{3}$.

32. The method of claim 31 wherein the substrate comprises silica.

33. The method of claim 31 wherein the step of forming a phase plate is done by etching the top surface.

34. An optical element for converting a uniform beam of light of wavelength λ into an array of illuminated spots, the optical element comprising:
  a phase plate comprising an array of constant phase zones, the phases associated with said array of constant phase zones including more than two different values if said phase plate is a one-dimensional phase plate and more than four different values if said phase plate is a two-dimensional phase plate, said phase plate for receiving said uniform beam of light of wavelength λ and generating an output beam of light therefrom, said output beam of light producing, through a reverse operation of the Talbot self-imaging phenomenon, an array of illuminated spots at a preselected distance from said phase plate; and
  a spacer assembly installed on the phase plate, said spacer assembly defining an image plane disposed parallel to and at the preselected distance from the phase plate.

35. The optical element of claim 34 wherein the phase plate is constructed from an N×N unit cell comprising $N^2$ constant phase zones, the phase $\phi_{I,J}$ associated with each constant phase zone in the unit cell being given by $$\phi_{I,J} = -\pi \frac{(I^2 + J^2)}{N}$$

where N is an integer that is greater than 2 and where I and J are indexes identifying the particular constant phase zone in the unit cell, when N is even, I and J are integers ranging from $-N/2$ to $(N/2-1)$ and when N is odd, I and J are half integers ranging from $-N/2$ to $(N/2-1)$.

36. The optical element of claim 34 wherein the phase plate is constructed from an N×N unit cell comprising $N^2$ constant phase zones, the phase $\phi_{I,J}$ associated with each constant phase zone in the unit cell being given by $$\phi_{I,J} = \pi \frac{(I^2 + J^2)}{N}$$

where N is an integer that is greater than 2 and where I and J are indexes identifying the particular constant phase zone in the unit cell, when N is even, I and J are integers ranging from $-N/2$ to $(N/2-1)$ and when N is odd, I and J are half integers ranging from $-N/2$ to $(N/2-1)$.

37. The optical element of claim 34 wherein the phase plate is constructed from an N×1 unit cell comprising N constant phase zones, the phase $\phi_I$ associated with each constant phase zone in the unit cell being given by $$\phi_I = -\pi \frac{I^2}{N}$$

where N is an integer that is greater than 2 and where I is an index identifying the particular constant phase zone in the unit cell, when N is even, I is an integer ranging from $-N/2$ to $(N/2-1)$ and when N is odd, I is a half integer ranging from $-N/2$ to $(N/2-1)$.

38. An optical element for converting a uniform beam of light of wavelength λ into an array of illuminated spots, the optical element comprising:
  a phase plate for receiving said uniform beam of light of wavelength λ and generating an output beam of light therefrom, said output beam of light producing, through a reverse operation of the Talbot self-imaging phenomenon, an array of illuminated spots at a preselected distance from said phase plate, said array of illuminated spots having a fill factor in at least one dimension that is less than $\frac{1}{3}$;
  said phase plate constructed from an N×N unit cell comprising $N^2$ constant phase zones, the phase $\phi_{I,J}$ associated with each constant phase zone in the unit cell being given by $$\phi_{I,J} = \pm \pi \frac{(I^2 + J^2)}{N}$$

where I and J are indexes identifying the particular constant phase zone in the unit cell, when N is even, I and J are integers ranging from $-N/2$ to $(N/2-1)$ and when N is odd, I and J are half integers ranging from $-N/2$ to $(N/2-1)$.

39. An optical element for converting a uniform beam of light of wavelength λ into an array of illuminated spots, the optical element comprising:
  a phase plate for receiving said uniform beam of light of wavelength λ and generating an output beam of light therefrom, said output beam of light producing, through a reverse operation of the Talbot self-imaging phenomenon, an array of illuminated spots at a preselected distance form said phase plate, said array of illuminated spots having a fill factor in at least one dimension that is less than $\frac{1}{3}$;
  said phase plate constructed from an N×1 unit cell comprising N constant phase zones, the phase $\phi_I$ associated with each constant phase zone in the unit cell being given by $$\phi_I = -\pi \frac{I^2}{N}$$

where N is an integer that is greater than 2 and where I is an index identifying the particular constant phase zone in the unit cell, when N is even, I is an integer ranging from $-N/2$ to $(N/2-1)$ and when N is odd, I is half integer ranging from $-N/2$ to $(N/2-1)$.

* * * * *